(12) United States Patent
Matsuzaki et al.

(10) Patent No.: US 10,613,325 B2
(45) Date of Patent: Apr. 7, 2020

(54) HEAD-UP DISPLAY DEVICE HAVING OPTICAL MEMBER INCLINATION ANGLE ADJUSTMENT, AND VEHICLE

(71) Applicant: Panasonic Intellectual Property Management Co., Ltd., Osaka (JP)

(72) Inventors: Keiichi Matsuzaki, Kyoto (JP); Michihiro Yamagata, Osaka (JP); Hideki Aiko, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/129,894

(22) Filed: Sep. 13, 2018

(65) Prior Publication Data

US 2019/0086662 A1    Mar. 21, 2019

(30) Foreign Application Priority Data

Sep. 21, 2017    (JP) .................................. 2017-181616

(51) Int. Cl.
*G02B 27/01*    (2006.01)
*B60K 35/00*    (2006.01)
*G01C 21/36*    (2006.01)

(52) U.S. Cl.
CPC .......... *G02B 27/0101* (2013.01); *B60K 35/00* (2013.01); *G02B 27/0149* (2013.01);
(Continued)

(58) Field of Classification Search
CPC ................ G02B 27/0101; G02B 27/01; G02B 27/0149; G02B 27/0179; G02B 2027/0138; G02B 2027/0154; G02B 2027/0185; G02B 2027/0141; B60K 35/00; B60K 2370/179; B60K 2370/166; B60K 2370/1529; B60K 2370/334; B60K 2370/177;
(Continued)

(56) References Cited

U.S. PATENT DOCUMENTS

2009/0160736 A1    6/2009    Shikita
2014/0253821 A1*   9/2014    Takatoh ................. B60K 35/00
                                                  349/11

(Continued)

FOREIGN PATENT DOCUMENTS

JP        6-115381        4/1994
JP        2009-150947     7/2009

*Primary Examiner* — Darlene M Ritchie
(74) *Attorney, Agent, or Firm* — Greenblum & Bernstein, P.L.C.

(57) ABSTRACT

A head-up display device projects a virtual image. The head-up display device includes a display, a first optical member, a second optical member, and an adjuster. The display outputs light that becomes a display image corresponding to the virtual image. The first optical member reflects the light incident from the display. The second optical member reflects or transmits the light reflected by the first optical member such that the virtual image is projected. The adjuster moves the first optical member to adjust a projection distance of the virtual image. The adjuster changes a distance between the first optical member and the second optical member and an inclination angle of the first optical member with respect to the display according to the projection distance of the virtual image.

9 Claims, 11 Drawing Sheets

(52) U.S. Cl.
CPC .. *G02B 27/0179* (2013.01); *B60K 2370/1529* (2019.05); *B60K 2370/166* (2019.05); *B60K 2370/179* (2019.05); *B60K 2370/21* (2019.05); *B60K 2370/23* (2019.05); *B60K 2370/31* (2019.05); *B60K 2370/334* (2019.05); *B60R 2300/205* (2013.01); *G01C 21/365* (2013.01); *G02B 2027/0127* (2013.01); *G02B 2027/0138* (2013.01); *G02B 2027/0141* (2013.01); *G02B 2027/0154* (2013.01); *G02B 2027/0159* (2013.01); *G02B 2027/0183* (2013.01); *G02B 2027/0185* (2013.01)

(58) Field of Classification Search
CPC ............ B60K 2370/21; B60K 2370/23; B60K 2370/31; B60R 2300/205; G01C 21/365
See application file for complete search history.

(56) References Cited

U.S. PATENT DOCUMENTS

| | | | | |
|---|---|---|---|---|
| 2015/0061976 | A1* | 3/2015 | Ferri | G02B 27/0101 345/9 |
| 2016/0209647 | A1* | 7/2016 | Fursich | G02B 27/0093 |
| 2016/0266390 | A1* | 9/2016 | Seo | G09G 3/001 |
| 2017/0131550 | A1* | 5/2017 | Oh | G06T 3/40 |
| 2017/0176744 | A1* | 6/2017 | El-Ghoroury | G02B 27/0101 |
| 2018/0157036 | A1* | 6/2018 | Choi | G02B 27/0101 |
| 2018/0196259 | A1* | 7/2018 | Chen | G02B 27/0101 |
| 2018/0364474 | A1* | 12/2018 | Honma | B60K 35/00 |
| 2019/0025580 | A1* | 1/2019 | Nagano | B60K 35/00 |
| 2019/0121128 | A1* | 4/2019 | Kasahara | G02B 27/0101 |
| 2019/0129172 | A1* | 5/2019 | Misawa | B60K 35/00 |
| 2019/0139286 | A1* | 5/2019 | Shimoda | B60K 35/00 |

* cited by examiner

HEAD-UP DISPLAY DEVICE HAVING OPTICAL MEMBER INCLINATION ANGLE ADJUSTMENT, AND VEHICLE

CROSS-REFERENCE TO RELATED APPLICATIONS

This application claims the benefit of foreign priority of Japanese patent application No. 2017-181616, filed on Sep. 21, 2017, the contents all of which are incorporated herein by reference.

TECHNICAL FIELD

The present disclosure relates to a vehicle display device, particularly to a head-up display device used in an automobile and the like.

BACKGROUND ART

A head-up display device is known as an information display device for the automobile and the like.

PTL 1 discloses a head-up display device that, using a concave mirror as a turning mirror, can be change a position of a virtual image by changing a distance between a display that is an object point and the concave mirror within a range where a virtual image point of the concave mirror appears in a manual or automatic manner or by a combination thereof.

PTL 2 discloses a vehicle head-up display device including a light source, a scanning unit that forms light from the light source into two-dimensional shape, a screen that forms an image of the scanning light, and a projection unit that projects a picture on the screen. In the vehicle head-up display device, a position of the projected virtual image can be changed by changing a distance between the projection unit and the screen.

CITATION LIST

Patent Literature

PTL 1: Unexamined Japanese Patent Publication No. H6-115381
PTL 2: Unexamined Japanese Patent Publication No. 2009-150947

SUMMARY OF THE INVENTION

The present disclosure provides a head-up display device that can easily project the virtual image in the head-up display device that can change a projection distance of the virtual image.

In a head-up display device according to one aspect of the present disclosure, an object person visually recognizes a virtual image projected in a target space by projecting an image. The head-up display device includes a display, a first optical member, a second optical member, and an adjuster. The display outputs light that becomes a display image corresponding to the virtual image. The first optical member reflects the light incident from the display. The second optical member reflects or transmits the light reflected by the first optical member such that the virtual image is projected. The adjuster moves the first optical member to adjust a projection distance of the virtual image. The adjuster changes a distance between the first optical member and the second optical member and an inclination angle of the first optical member with respect to the display according to the projection distance of the virtual image.

According to the head-up display device of the present disclosure, the adjuster changes the distance and the inclination angle with respect to the first optical member, which allows the projection of the virtual image can be facilitated in the head-up display device that can change the projection distance of the virtual image.

DESCRIPTION OF EMBODIMENTS

Hereinafter, exemplary embodiments will be described in detail with reference to the drawings as appropriate. However, detailed descriptions that are more than necessary may be omitted. For example, detailed description of well-known matters and repeated description of substantially the same structure may be omitted. Such omissions are for avoiding unnecessary redundancy in the following description and for facilitating understanding by those skilled in the art. It should be noted that the attached drawings and the following description are provided, by the inventor, for those skilled in the art to fully understand the present disclosure, and are not intended to limit the subject matter described in the appended claims.

In all the drawings, a component having a common function is denoted by the identical reference mark, and the overlapping description will be omitted.

First Exemplary Embodiment

[1-1. Configuration]
[1-1-1. Configuration of Vehicle]

Figure 1:
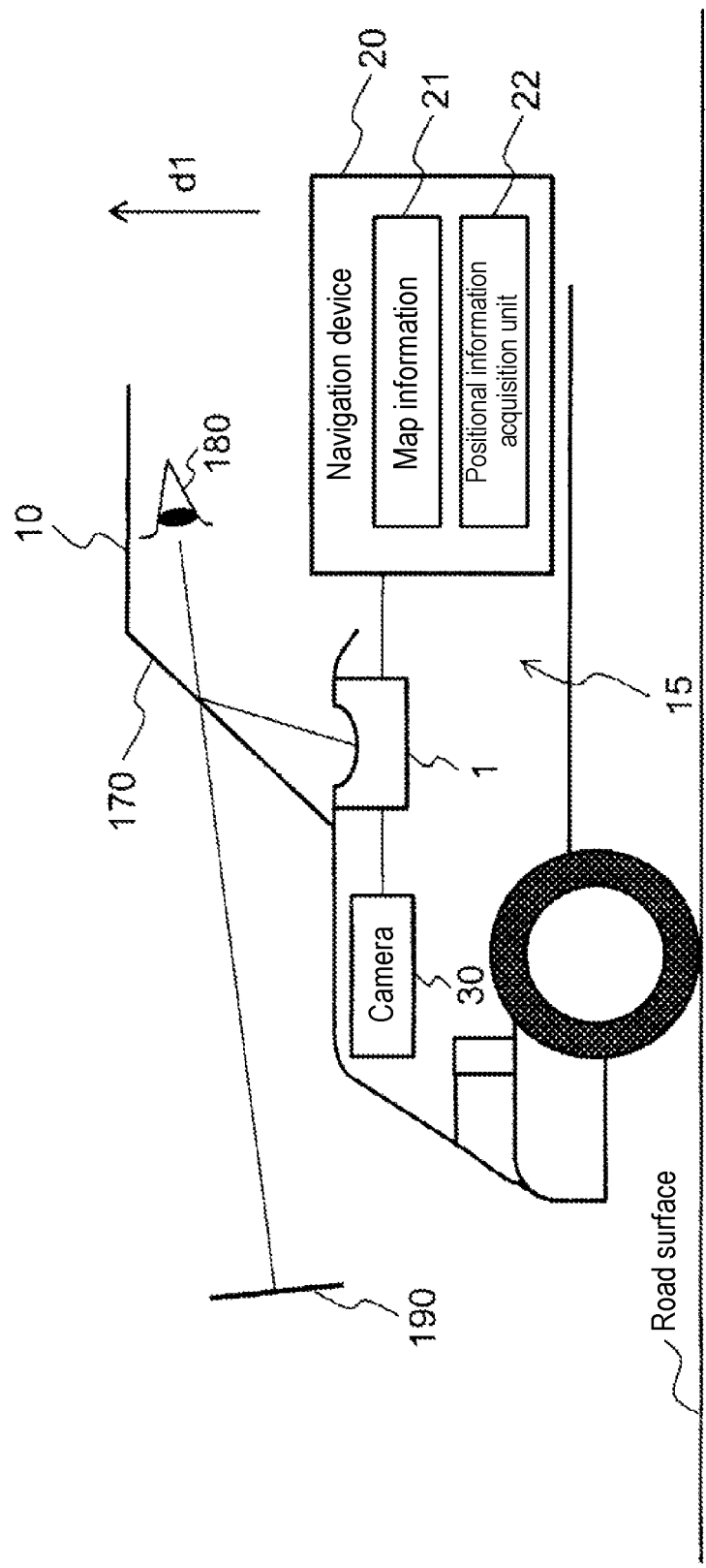
FIG. 1 is a view illustrating a configuration example of a vehicle equipped with a navigation system in which a head-up display device according to a first exemplary embodiment of the present disclosure is used.

FIG. 1 is a view illustrating a configuration example of a vehicle equipped with a navigation system in which a head-up display device according to a first exemplary embodiment of the present disclosure is used. Vehicle 10 in FIG. 1 includes navigation system 15 and camera 30. Navigation system 15 includes head-up display device 1 and navigation device 20. Hereinafter, in a vertical direction d1 of vehicle 10 in FIG. 1, sometimes a positive orientation is referred to as above and a negative orientation is referred to as below. Vehicle 10 is located above a road surface.

Navigation device 20 provides routing information to a previously-set destination to a driver, to perform route guidance. In navigation device 20, map information 21 is stored in a built-in memory. Navigation device 20 includes positional information acquisition unit 22 such as a GPS (Global Positioning System), and acquires positional information about an own vehicle to store the positional information in the built-in memory.

For example, camera 30 photographs an area in front of the own vehicle to generates image information.

Head-up display device 1 projects virtual image 190 to an area in front of windshield 170 with respect to driver's eyes 180 by projecting picture light to windshield 170 of the vehicle. Head-up display device 1 sets a projection distance of virtual image 190, based on vehicle positional information or map information from navigation device 20 or image information from camera 30. As used herein, the projection distance mainly means a distance from the driver to virtual image 190.

[1-1-2. Schematic Configuration of Head-Up Display Device]

Figure 2:
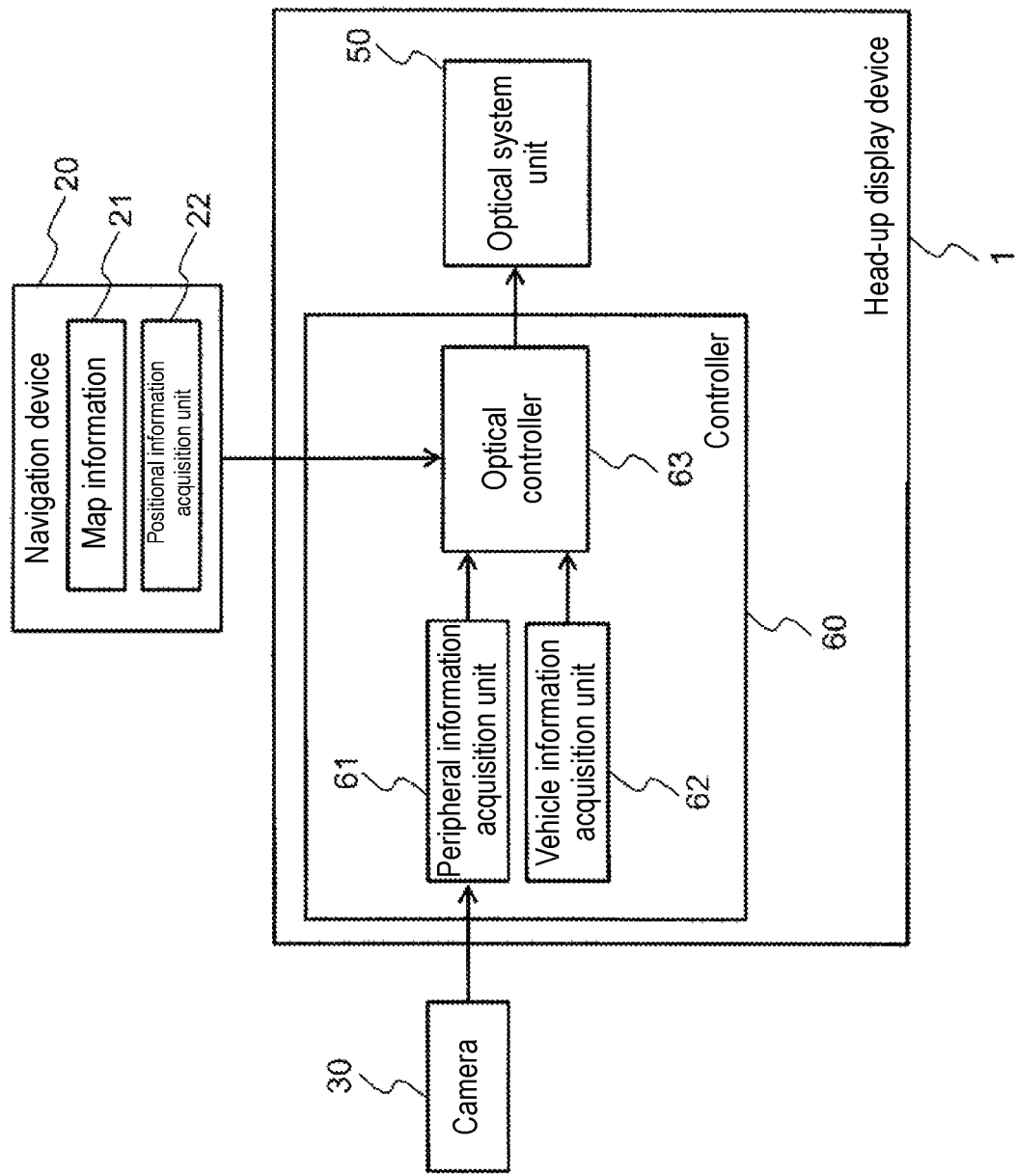
FIG. 2 is a block diagram illustrating a configuration example of the head-up display device of the first exemplary embodiment.

FIG. 2 is a block diagram illustrating a configuration example of head-up display device 1 of the first exemplary embodiment of the present disclosure.

Head-up display device 1 includes optical system unit 50 and controller 60.

Controller 60 is constructed with, for example, a central processing unit (CPU) or a micro processing unit (MPU), and implements various functions by executing a program stored in a memory. Controller 60 may be constructed with a hardware circuit (for example, application specific integrated circuit (ASIC), field-programmable gate array (FPGA)) such as a dedicated electronic circuit and a reconfigurable electronic circuit. The functions of controller 60 may be implemented by cooperation of hardware and software or only by hardware (electronic circuit).

Controller 60 includes peripheral information acquisition unit 61, vehicle information acquisition unit 62, and optical controller 63.

By analyzing information about an image in front of the vehicle from camera 30, peripheral information acquisition unit 61 detects a surrounding building, a scene, and an object on a road surface to acquire information about a distance from the own vehicle to the building or the object. For example, the object on the road surface is an intersection.

Vehicle information acquisition unit 62 acquires speed information from various sensors of the vehicle.

Optical controller 63 extracts the surrounding building, the scene, and the object on the road surface, based on the map information from navigation device 20. Optical controller 63 obtains the information about the distance from the vehicle to the building or the object, based on the vehicle positional information and the map information from navigation device 20. Based on the obtained distance information, optical controller 63 projects virtual image 190 to optical system unit 50 such that virtual image 190 is located in a vicinity of the building or the object. Consequently, for example, facility information is projected to the vicinity of the building as the information about navigation device 20, or route guidance information can be projected to the vicinity of the intersection as the information about navigation device 20.

Alternatively, based on the information about the distance from the own vehicle to the building or the object by peripheral information acquisition unit 61, optical controller 63 may cause optical system unit 50 to project virtual image 190 such that virtual image 190 is located in the vicinity of the building or the object.

Optical controller 63 may set the projection distance of virtual image 190, based on the speed information about the vehicle from vehicle information acquisition unit 62. For example, the virtual image is projected far in the case that a point of view of the driver is set far while the vehicle travels at high speed, and the projection distance of virtual image 190 may be set such that the virtual image is projected near in the case that the point of view of the driver is set near while the vehicle travels at low speed Optical system unit 50 includes an optical system that projects the virtual image. Optical system unit 50 of head-up display device 1 will be described below. In head-up display device 1 of FIG. 3, only optical system unit 50 is illustrated while controller 60 is omitted (the same holds true for second to sixth exemplary embodiments).

[1-1-3. Configuration of Head-Up Display Device (Optical System Unit)]

Figure 3:
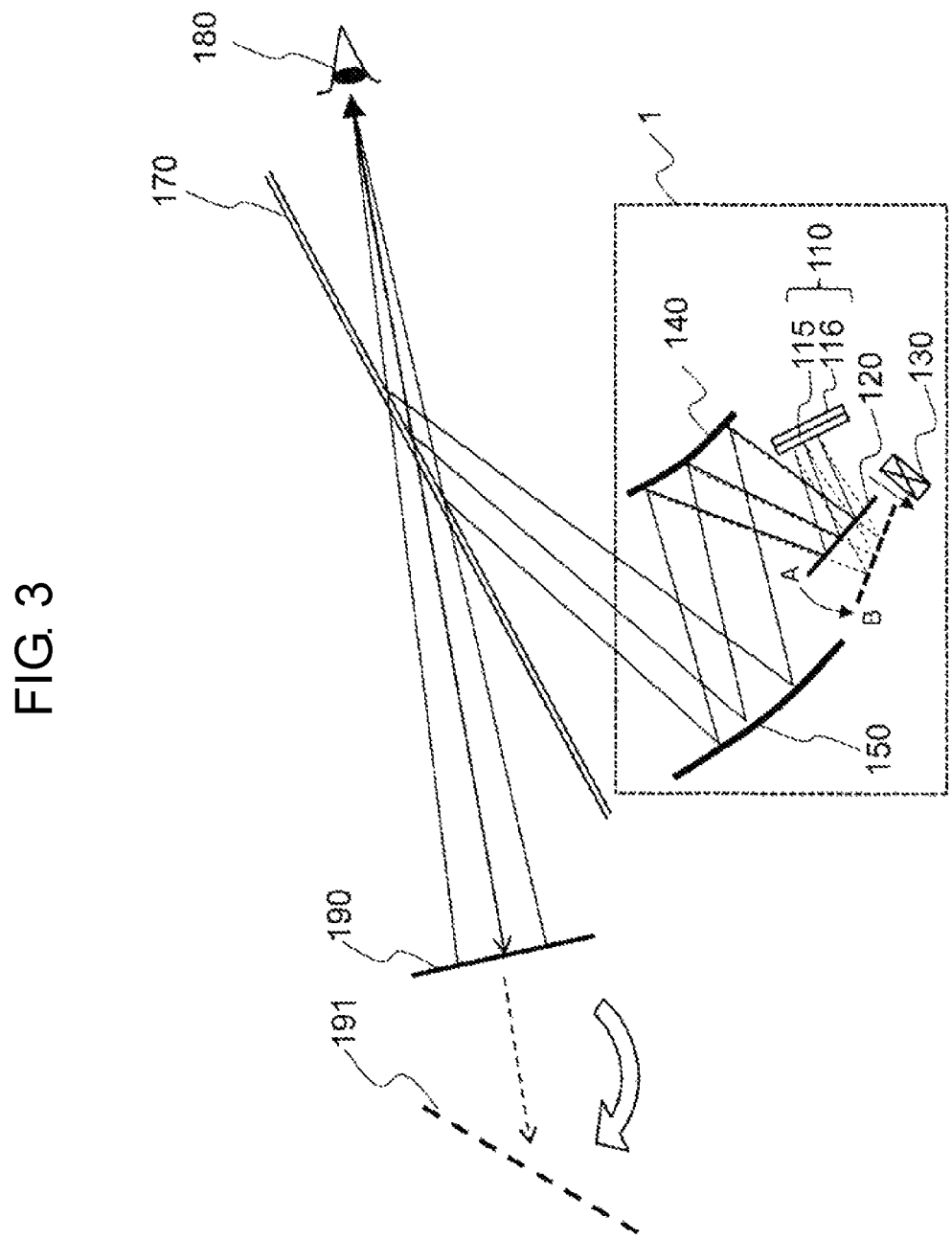
FIG. 3 is a view illustrating a configuration example of an optical system unit in the head-up display device of the first exemplary embodiment.

FIG. 3 is a view illustrating a configuration example of the optical system unit in head-up display device 1 of the first exemplary embodiment of the present disclosure.

Head-up display device 1 of the first exemplary embodiment includes display 110, movable mirror 120 that is a first optical member, adjuster 130, first mirror 140 that is a second optical member, and second mirror 150.

Display 110 outputs light (hereinafter, referred to as display light) that becomes a display image, such as operation information and route information, which is displayed to the driver. For example, display 110 is a liquid crystal display module, and includes liquid crystal display panel 115 and backlight 116. Display 110 may include a liquid crystal display panel driving circuit board, a light guide, a lens, a diffuser, and a heat sink for the backlight. Backlight 116 of the first exemplary embodiment has a plurality of light distribution direction in display 110 (see FIG. 6). The light distribution direction of display 110 will be described later.

Movable mirror 120 reflects display light incident from display 110 toward first mirror 140. In the first exemplary embodiment, for example, movable mirror 120 is a substantially planar mirror.

Adjuster 130 is a driving mechanism that moves movable mirror 120. In head-up display device 1 of the first exemplary embodiment, for example, adjuster 130 adjusts inclination while shifting movable mirror 120 between position A and position B as illustrated in FIG. 3. A specific configuration of adjuster 130 will be described later.

Positions A, B of movable mirror 120 indicate a movable range of adjuster 130, and a distance from first mirror 140 to position B is farther than a distance from first mirror 140 to position A. The inclination of movable mirror 120 can be defined as an inclination angle at which movable mirror 120 is inclined with respect to various reference directions in head-up display device 1.

First mirror 140 reflects the display light reflected by movable mirror 120 toward second mirror 150. First mirror 140 is a convex mirror such as a spherical mirror.

Second mirror 150 reflects and condenses the display light reflected by first mirror 140, and outputs the display light toward windshield 170. For example, second mirror 150 is a concave mirror.

[1-1-4. Configuration Example of Adjuster]

Figure 4:
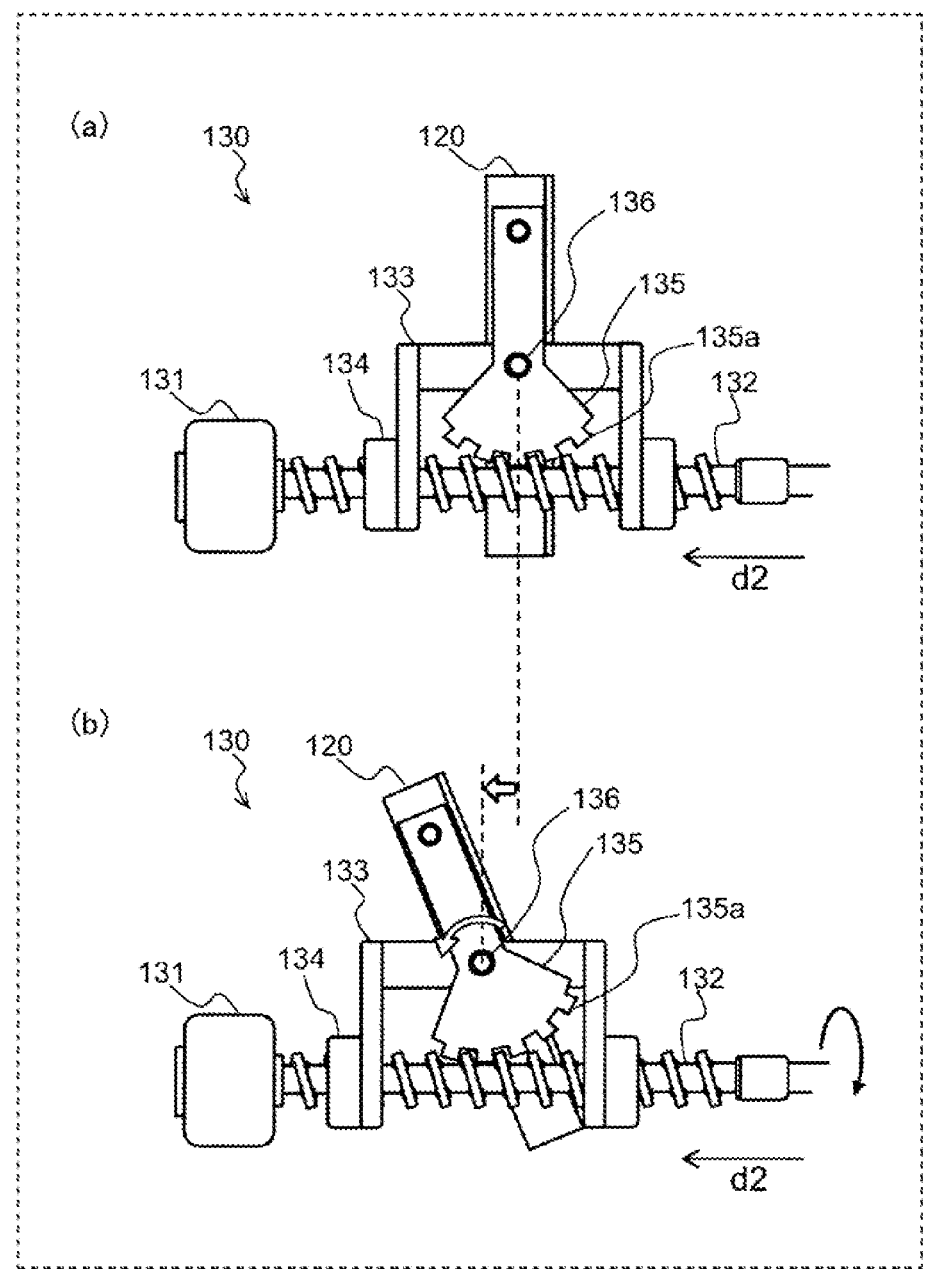
FIG. 4 is a view illustrating a configuration example of an adjuster of the head-up display device.

A specific configuration of adjuster 130 in head-up display device 1 will be described with reference to FIG. 4. FIG. 4 is a view illustrating a configuration example of adjuster 130.

A part (a) of FIG. 4 illustrates an example of the configuration of adjuster 130. A part (b) of FIG. 4 illustrates a state in which movable mirror 120 is moved by adjuster 130 in the part (a) of FIG. 4. Hereinafter, direction d2 in which adjuster 130 shifts the position of movable mirror 120 is referred to as a shift direction.

In a configuration example in the part (a) of FIG. 4, adjuster 130 includes motor 131, feed screw 132, and support member 133. Movable mirror 120 is attached to a side surface of support member 133 of adjuster 130.

Motor 131 rotates feed screw 132 about an axis. For example, motor 131 is controlled by controller 60 based on a detection signal from various sensors of the vehicle or driving information output from navigation device 20.

As illustrated in the part (a) of FIG. 4, feed screw 132 is disposed such that an axial direction of feed screw 132 is parallel to shift direction d2. An end of feed screw 132 is connected to motor 131. Feed screw 132 is inserted through support member 133.

Support member 133 supports movable mirror 120. Support member 133 includes insertion unit 134 through which feed screw 132 is inserted and gear 135 fixed to movable mirror 120. Gear 135 is attached to insertion unit 134 with hinge 136 interposed therebetween. Hinge 136 has a rotation axis orthogonal to the axial direction of feed screw 132. Gear 135 includes a plurality of teeth 135a that can engage with a thread groove of feed screw 132. Various dimensions such as a pitch and a size of teeth 135a in support member 133 can appropriately be set.

In adjuster 130 having the above configuration, movable mirror 120 is supported by support member 133 in posture (inclination) corresponding to a state in which gear 135 engages with feed screw 132. Adjuster 130 rotates feed screw 132 using motor 131 to shift support member 133 in shift direction d2 as illustrated in the part (b) of FIG. 4. At this point, gear 135 rotates about the rotation axis of hinge 136 in support member 133, thereby changing the posture of movable mirror 120.

As described above, adjuster 130 of the first exemplary embodiment can adjust the position in shift direction d2 of movable mirror 120 and the orientation of movable mirror 120 in an interlocking manner by the rotation control of motor 131. The above configuration of adjuster 130 is only by way of example, and various configurations may be adopted as adjuster 130.

[1-2. Action]

[1-2-1. Entire Operation]

Action of head-up display device 1 of the first exemplary embodiment will be described.

As illustrated in FIG. 1, the display light output from display 110 is reflected by movable mirror 120, reflected and condensed by first mirror 140 and second mirror 150, reflected by windshield 170 of the vehicle, and reaches driver's eyes 180.

Driver's eyes 180 visually recognized the display image displayed on display 110 as virtual image 190 in the distance ahead of windshield 170.

Adjuster 130 moves movable mirror 120 between positions A, B to be able to change a distance (hereinafter, referred to as a virtual image distance) from driver's eyes 180 to virtual image 190. For example, adjuster 130 changes a display position of virtual image 190 between virtual image 190 and virtual image 191. A virtual image distance adjusting method will be described later.

In an AR (Augmented Reality)-HUD application, for example, the position of movable mirror 120 is set based on a distance from the surrounding building, the scene, or the object on the road surface to the vehicle, the distance being obtained from position information about the vehicle, map information 21 of navigation device 20, or information from camera 30 and peripheral information acquisition unit 61.

As described above, the position of movable mirror 120 may be set based on the vehicle speed information from various sensors of the vehicle. For example, the virtual image is projected far in the case that the point of view of the driver is set far while the vehicle travels at high speed, and the projection position of movable mirror 120 may be set such that the virtual image is projected near in the case that the point of view of the driver is set near while the vehicle travels at low speed Consequently, movement of the point of view in the driver can be reduced.

Additionally, the virtual image may appropriately be adjusted to the distance at which the driver feels that the virtual image is easily viewed according to a physiological factor such as visual power or taste such as a driving posture.

[1-2-2. Virtual Image Distance Adjusting Method]

Figure 5:
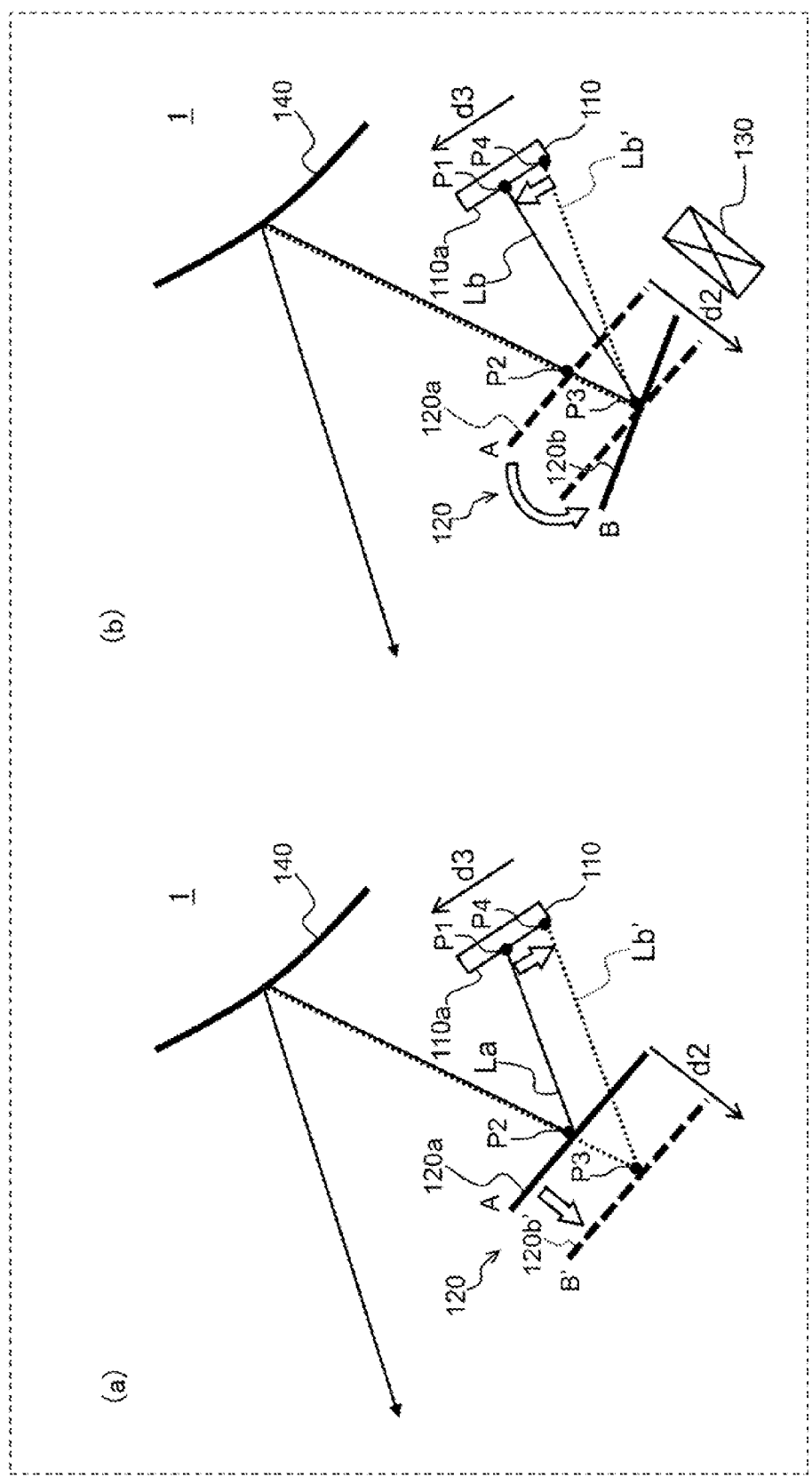
FIG. 5 is a view illustrating a method for adjusting a virtual image distance in the head-up display device.

The virtual image distance adjusting method in head-up display device 1 of the first exemplary embodiment will be described below. In the first exemplary embodiment, adjuster 130 moves movable mirror 120 to adjust the virtual image distance. An example in which the virtual image distance is set far will be described below as an example of the virtual image distance adjusting method with reference to FIG. 5. FIG. 5 is a view illustrating the virtual image distance adjusting method.

A part (a) of FIG. 5 illustrates optical path La before the virtual image distance in head-up display device 1 is adjusted and optical path Lb' in the case that movable mirror 120 is translated. A part (b) of FIG. 5 illustrates optical path Lb after adjuster 130 of the first exemplary embodiment adjusts the virtual image distance. In the parts (a) and (b) of FIG. 5, reference direction d3 is illustrated as an example of the reference direction of the inclination of movable mirror 120. Reference direction d3 is a direction from a far side (−d3 side) toward a near side (+d3 side) with respect to first mirror 140 in display 110.

Optical path La in the part (a) of FIG. 5 indicates an optical path through which light from point P1 existing on display surface 110a of display 110 passes when being reflected by movable mirror 120 at pre-movement position A. In optical path La, the light from point P1 is incident on point P2 on reflecting surface 120a of movable mirror 120 at position A, and is output from point P2 to first mirror 140. The light passing through optical path La is output to an outside of head-up display device 1, and generates a part of virtual image 190 before the adjustment (FIG. 3).

Optical path Lb' indicates an optical path that generates the same portion as optical path La before the adjustment in the virtual image after the adjustment in the case that movable mirror 120 is translated to adjust the virtual image distance. Optical paths La, Lb' before and after the adjustment are matched with each other in a portion in which the light is output from first mirror 140, and optical paths La, Lb' become the same straight line in a portion in which the light is output from movable mirror 120 toward first mirror 140. In optical path Lb' after the adjustment, a portion in which the light is incident on movable mirror 120 connects point P3 on reflecting surface 120*b*' at position B' after the translation and display surface 110*a* at such an incident angle that the light passes through the above portions after the reflection.

In optical path Lb' shown in the part (a) of FIG. 5, point P4 on display surface 110*a* of display 110 deviates from point P1, of movable mirror 120, before the translation onto the −d3 side. In this way, by the translation of movable mirror 120, the position of the display image is assumed to deviate on display surface 110*a* of display 110 before and after the adjustment of the virtual image distance. In this case, it is considered that such image processing that the position of the display image is changed on display surface 110*a* every time the virtual image distance is adjusted is required. During such a specification change that an adjustment width of the projection distance of the virtual image is widened, it is necessary to enlarge display surface 110*a*, which results in enlargement of display 110.

For this reason, in head-up display device 1 of the first exemplary embodiment, adjuster 130 adjusts the inclination of movable mirror 120 while shifting the position of movable mirror 120 such that the position of the display image does not deviate on display surface 110*a* during the adjustment of the virtual image distance. The part (b) of FIG. 5 illustrates optical path Lb in the case that the adjustment is performed by adjuster 130 of the first exemplary embodiment.

In optical path Lb shown in the part (b) of FIG. 5, the portion after the light is output from point P3 of movable mirror 120 is similar to the case of optical path Lb', the portion on which the light is incident point P3 is adjusted according to the inclination of movable mirror 120. In the case of the part (b) of FIG. 5, adjuster 130 changes the inclination of movable mirror 120 before and after the movement such that a movement adjustment width toward an orientation +d2 from position A before the movement to position B after the movement at an end on the +d3 side in movable mirror 120 is larger than a movement adjustment width at an end on the −d3 side. Consequently, the deviation between points P1, P4 is canceled on the display 110 during the translation, and the point on display 110 in optical path Lb after the adjustment (position B) can be matched with point P1 before the adjustment (position A).

For example, the inclination of movable mirror 120 can be defined as an inclination angle (of the reflecting surface) of movable mirror 120 with respect to reference direction d3. For example, the inclination angle of movable mirror 120 is set in each position in shift direction d2 of movable mirror 120. For example, in the case that movable mirror 120 is located at various positions between positions A, B, the inclination angle of movable mirror 120 may be set at each position such that the portion in which the light from point P1 of display 110 is output from movable mirror 120 is not changed in the optical path. For example, the inclination angle can be set by design of the pitch or size of teeth 135*a* of gear 135 in adjuster 130 of the example in FIG. 4. The setting may be performed in consideration of a plurality of points on display 110 or an optical path of the light from entire display surface 110*a*.

According to the virtual image distance adjusting method performed by adjuster 130 of the first exemplary embodiment, the display image at the same position on display surface 110*a* can be used before and after the adjustment of the virtual image distance, and the image processing can be omitted or the enlargement of display 110 can be avoided. In this way, according to head-up display device 1 of the first exemplary embodiment, the virtual image in which the virtual image distance is adjustable can easily be projected.

According to the virtual image distance adjusting method, the movement adjustment width varies according to the positions on reflecting surfaces 120*a*, 120*b* of movable mirror 120 before and after the movement, so that a length of the corresponding optical path also varies. Consequently, in the example of FIG. 3, virtual image 191 after the adjustment is visually recognized so as to come down onto the driver side while going away from virtual image 190 before the adjustment. The postures of virtual images 190, 191 before and after the adjustment may appropriately be set by the disposition of various optical systems in head-up display device 1.

In the above description, the virtual image distance is set far by way of example. A similar adjustment method can be adopted in the case that the virtual image distance is brought close.

[1-2-3. Light Distribution Control]

According to the virtual image distance adjusting method, the orientation of the portion in which the light is incident from display 110 to movable mirror 120 is changed in optical paths La, Lb (the parts (a) and (b) of FIG. 5) before and after the adjustment in association with the adjustment of the inclination angle of movable mirror 120. In the first exemplary embodiment, a light distribution direction in display 110 is controlled together with the adjustment of movable mirror 120. The method for controlling the light distribution direction of display 110 in the first exemplary embodiment will be described with reference to FIG. 6.

Figure 6:
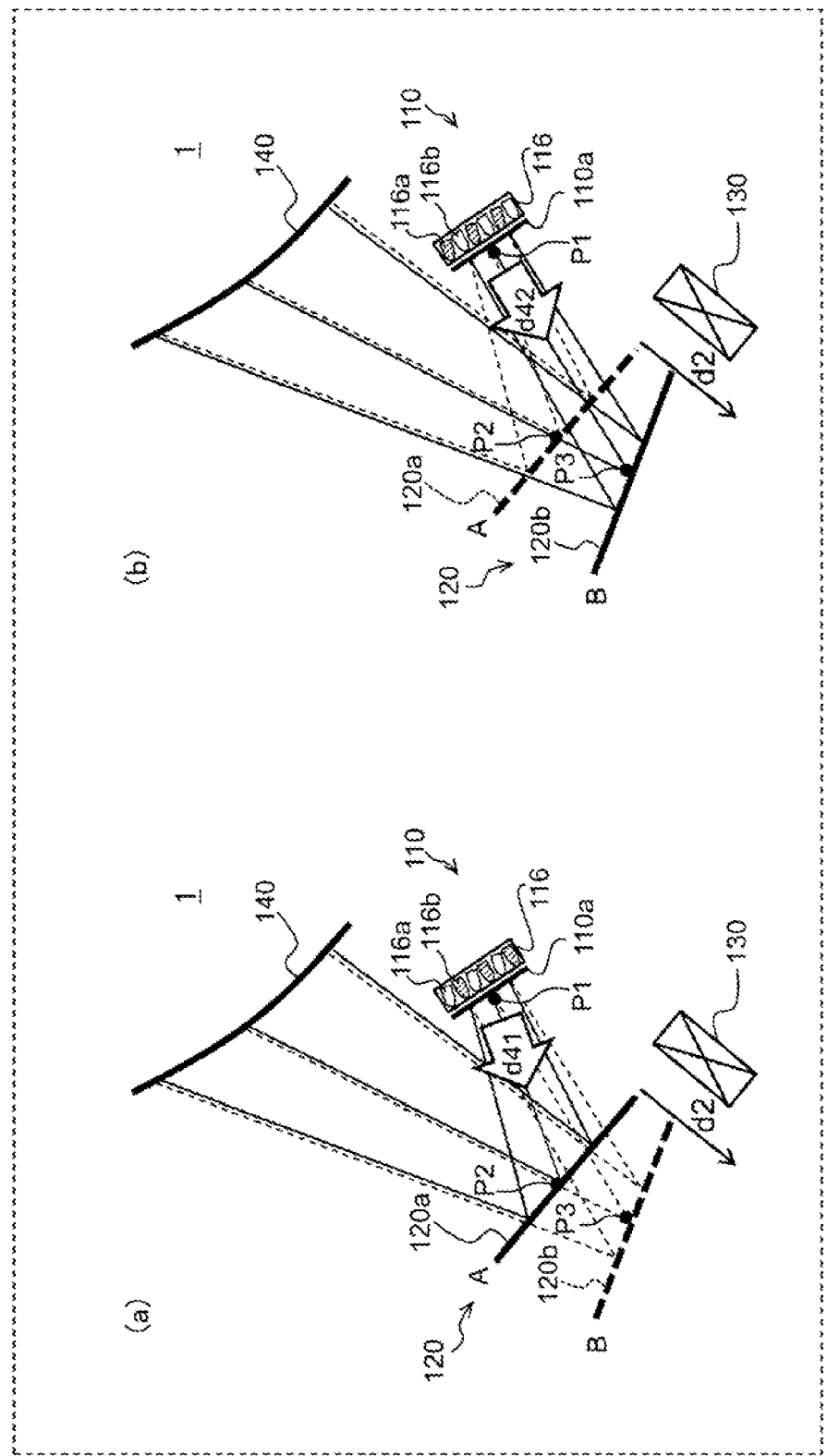
FIG. 6 is a view illustrating light distribution control of an example of a display in the head-up display device.

FIG. 6 is a view illustrating the light distribution control of an example of display 110 in head-up display device 1 of the first exemplary embodiment. A part (a) of FIG. 6 illustrates a control state of display 110 with respect to movable mirror 120 at position A. A part (b) of FIG. 6 illustrates a control state of display 110 with respect to movable mirror 120 at position B.

In the example of FIG. 6, backlight 116 of display 110 includes a first set of light source elements 116*a* having first light distribution direction d41 and a second set of light source elements 116*b* having second light distribution direction d42 different from first light distribution direction d41. For example, the first set of light source elements 116*a* and the second set of light source elements 116*b* are alternately disposed. For example, the first and second sets of light source elements 116*a*, 116*b* are constructed with a white LED.

First light distribution direction d41 is a direction corresponding to the inclination angle of movable mirror 120 at position A (the part (a) of FIG. 6). For example, the light output from point P1 of display 110 along first light distribution direction d41 is incident on point P2 on reflecting surface 120*a* at position A. The incident light is reflected by reflecting surface 120*a*, thereby generating virtual image 190 corresponding to position A in FIG. 3 (see the part (a) of FIG. 5).

Second light distribution direction d42 is a direction corresponding to the inclination angle of movable mirror 120 at position B (the part (b) of FIG. 6). For example, the light output from point P1 of display 110 along second light distribution direction d42 is incident on point P3 on reflecting surface 120*b* at position B. The incident light is reflected by reflecting surface 120*b*, thereby generating virtual image 191 corresponding to position B in FIG. 3 (see the part (b) of FIG. 5).

In the first exemplary embodiment, light distribution directions d41, d42 of backlight 116 in display 110 are controlled while switched according to the virtual image distance. For example, when determining that movable mirror 120 is located at position A, controller 60 (FIG. 2) of head-up display device 1 controls backlight 116 of display 110, and turns on the first set of light source elements 116a while turning off the second sets light source elements 116b as illustrated in the part (a) of FIG. 6.

On the other hand, when determining that movable mirror 120 is located at position B, controller 60 turns off the first set of light source elements 116a while turning on the second set of light source elements 116b as illustrated in the part (b) of FIG. 6. For example, controller 60 may make the determination based on which one of positions A, B is closer to the position of movable mirror 120.

According to the light distribution control, when movable mirror 120 is adjusted between positions A, B, the light distribution direction of display 110 is switched according to the optical paths through which virtual image 190, 191 at virtual image distances are projected, and the light projecting the virtual image can efficiently be obtained.

[1-3. Summary]

As described above, head-up display device 1 of the first exemplary embodiment is the device that projects the virtual image. Head-up display device 1 includes display 110, movable mirror 120 that is an example of the first optical member, first mirror 140 that is an example of the second optical member, and adjuster 130. Display 110 outputs light that becomes the display image corresponding to the virtual image. Movable mirror 120 reflects the light incident from display 110. First mirror 140 reflects or transmits the light reflected by movable mirror 120 such that the virtual image is projected. Adjuster 130 moves movable mirror 120 to adjust the projection distance of the virtual image. Adjuster 130 changes the distance between movable mirror 120 and first mirror 140 and the inclination angle of movable mirror 120 with respect to display 110 according to the projection distance of the virtual image.

According to head-up display device 1, adjuster 130 adjusts the virtual image distance by changing both the distance between movable mirror 120 and first mirror 140 and the inclination angle with respect to display 110. Consequently, in head-up display device 1 that can change the virtual image distance, the projection of the virtual image can be facilitated.

In the first exemplary embodiment, adjuster 130 changes the inclination angle during the movement of movable mirror 120 such that the movement adjustment width of movable mirror 120 at the end on the +d3 side closer to first mirror 140 than to display 110 is larger than the movement adjustment width of movable mirror 120 at the end on the −d3 side closer to display 110 than to first mirror 140. Consequently, the display image position deviation that may be generated in display 110 during the translation of movable mirror 120 can be prevented, and display 110 can easily be constructed in head-up display device 1. For example, miniaturization of display 110 can be achieved.

In the first exemplary embodiment, adjuster 130 changes the distance and the inclination angle such that the optical path through which the light output from a specific position in display 110 passes after being reflected by movable mirror 120 is not changed before and after the movement of movable mirror 120. Consequently, the display image position deviation in display 110 can be prevented with high accuracy.

In the first exemplary embodiment, display 110 includes backlight 116 that is an example of a light source having two light distribution directions d41, d42. First and second light distribution directions d41, d42 are directions corresponding to the inclination angles of positions A, B of movable mirror 120. Consequently, the light projecting the virtual image corresponding to each of positions A, B can efficiently be obtained. First and second light distribution directions d41, d42 may be controlled by changing a light quantity ratio of the first set of light source elements 116a and the second set of light source elements 116b together with the position of movable mirror 120.

A number of light distribution directions of the light source in display 110 is not limited to two, but at least three light distribution directions may be used. Even in this case, each light distribution direction is set according to the inclination angles different from one another in movable mirror 120, which allows the light distribution control of the light projecting the virtual image corresponding to each virtual image distance. In the case that the light distribution control is not particularly performed, one light distribution direction may be used in backlight 116.

In the first exemplary embodiment, disposition order of the mirrors reflecting the display light output from display 110 is order of movable mirror 120, first mirror 140, and second mirror 150. However, the disposition order is not limited to the order of the first exemplary embodiment. For example, movable mirror 120 may be disposed between first mirror 140 and second mirror 150. However, a light flux width of a light flux output from display 110 increases every time the light flux is reflected by the mirror. For this reason, movable mirror 120 is used as the mirror initially reflecting the light flux output from display 110, which allows an area of movable mirror 120 to be reduced. This enables the miniaturization of adjuster 130 small driving force necessary for motor 131, and it is preferable on device design.

In the first exemplary embodiment, the convex spherical mirror is used as first mirror 140, the concave spherical mirror is used as second mirror 150, and the two mirrors are used in the virtual image projection optical system. However, the virtual image projection optical system is not limited to the first exemplary embodiment. Each mirror may be a spherical concave mirror, a spherical convex mirror, an aspherical concave mirror, an aspherical convex mirror, or a free curve surface mirror.

The number of mirrors constituting the virtual image projection optical system is not limited to two, and one or at least three mirrors may be used.

In the first exemplary embodiment, movable mirror 120 that is an example of the first optical member is the substantially planar mirror. Alternatively, for example, the first optical member may be a free curved surface mirror, an aspherical mirror, or a spherical mirror.

Second Exemplary Embodiment

A head-up display device, in which the virtual image is visually recognized so as to come down ahead of the road surface while the virtual image distance goes away, will be described in a second exemplary embodiment.

[2-1. Configuration]

Figure 7:
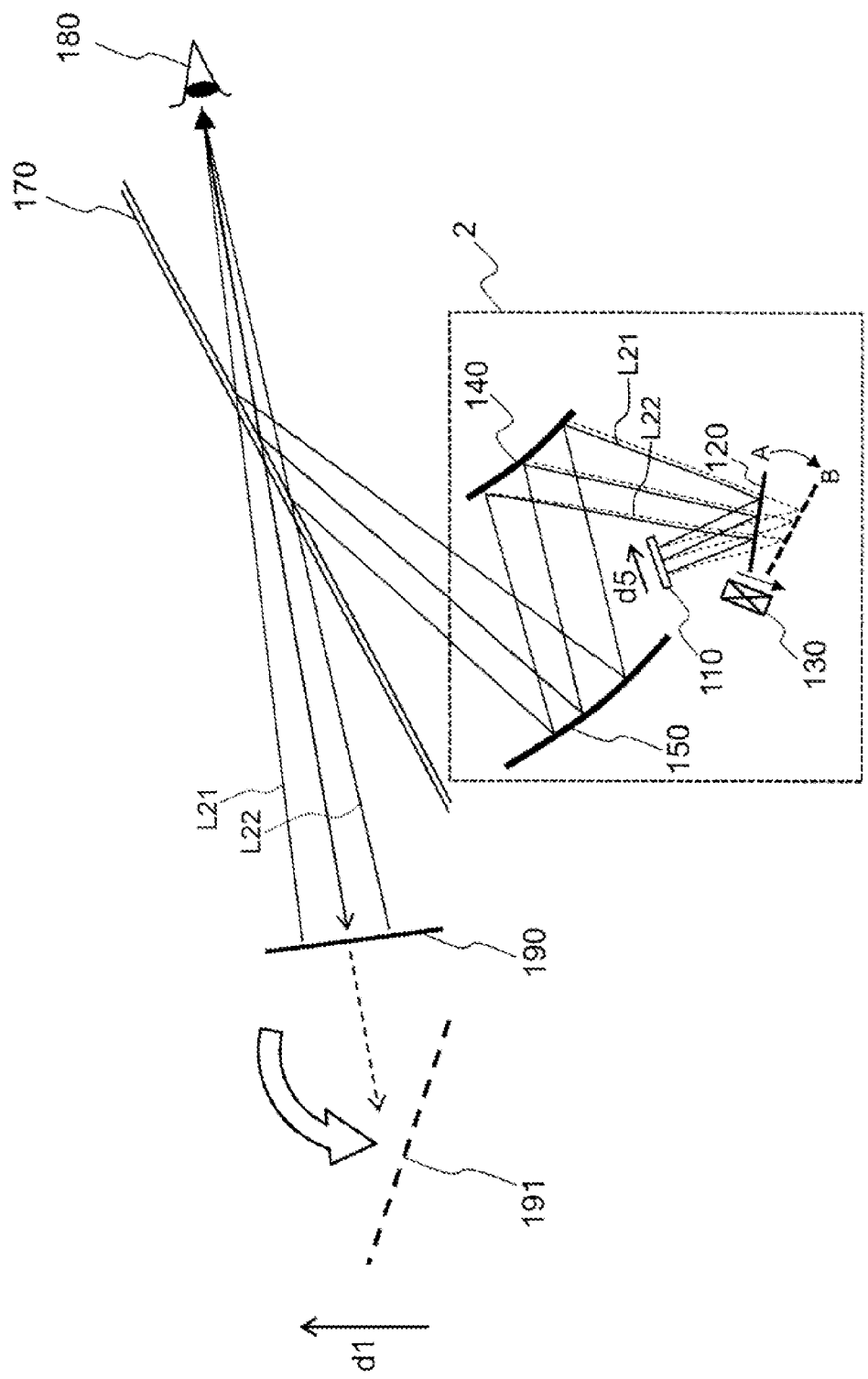
FIG. 7 is a view illustrating a configuration example of an optical system unit in a head-up display device according to a second exemplary embodiment.

FIG. 7 is a view illustrating a configuration example of an optical system unit in head-up display device 2 of the second exemplary embodiment. In FIG. 7, the component that performs operation similar to that in FIG. 3 is designated by the same reference mark, and the description will be omitted.

In head-up display device 2 of the second exemplary embodiment, as illustrated in FIG. 7, the disposition of movable mirror 120 and display 110 with respect to first mirror 140 is changed in a configuration similar to that of head-up display device 1 (FIG. 3) of the first exemplary embodiment.

In the example of FIG. 3, movable mirror 120 is disposed in the vicinity between first mirror 140 and second mirror 150. In the example of FIG. 7, as compared with movable mirror 120, display 110 is disposed in the vicinity between first and second mirrors 140, 150. Referring to FIG. 7, in display 110, a direction from the side closer to second mirror 150 than to first mirror 140 (−d5 side) toward the side closer to first mirror 140 than to second mirror 150 (+d5 side) is set to reference direction d5.

[2-2. Action]

In the second exemplary embodiment, adjuster 130 changes the inclination angle of movable mirror 120 during the movement of movable mirror 120 such that the movement adjustment width at the end on the +d5 side of movable mirror 120 is larger than the movement adjustment width at the end on the −d5 side of movable mirror 120. Consequently, optical path L21 of the light reflected on the +d5 side of movable mirror 120 is considerably extended as compared with optical path L22 of the light reflected on the −d5 side.

In the disposition example of FIG. 7, optical path L21 of the light reflected on the +d5 side of movable mirror 120 corresponds to an upper portion of virtual image 190 in vertical direction d1 of the vehicle, and optical path L22 of the light reflected on the −d5 side corresponds to a lower portion of virtual image 190. Thus, in setting the virtual image distance in the distance, optical path L21 corresponding to the upper portion of each of virtual images 190, 191 is extended longer than optical path L22 corresponding to the lower portion. Consequently, as illustrated in FIG. 7, driver's eyes 180 can visually recognize virtual image 191 after the adjustment such that virtual image 191 comes down along the road surface.

[2-3. Summary]

As described above, in the case that head-up display device 2 of the second exemplary embodiment is mounted on the vehicle, display 110, movable mirror 120, and first mirror 140 are disposed such that optical path L21 corresponding to the upper portion of each of virtual image in vertical direction d1 of the vehicle is extended longer than optical path L22 corresponding to the lower portion as the projection distance of the virtual image becomes long. Consequently, a screen display by the virtual image can visually recognized so as to overlap the road surface when the virtual image distance goes away, and head-up display device 2 of the second exemplary embodiment is useful in the AR-HUD application and the like.

In the second exemplary embodiment, the posture of the virtual image is changed using the disposition example of the optical system in FIG. 7. However, the disposition example in FIG. 7 is by way of example. The virtual image that comes down to the road surface as the virtual image distance becomes long can be obtained by various kinds of disposition of the optical system in consideration of an extending way of the optical path corresponding to each of the upper and lower portions of the virtual image during the adjustment of the virtual image distance.

Third Exemplary Embodiment

[3-1. Configuration]

Figure 8:
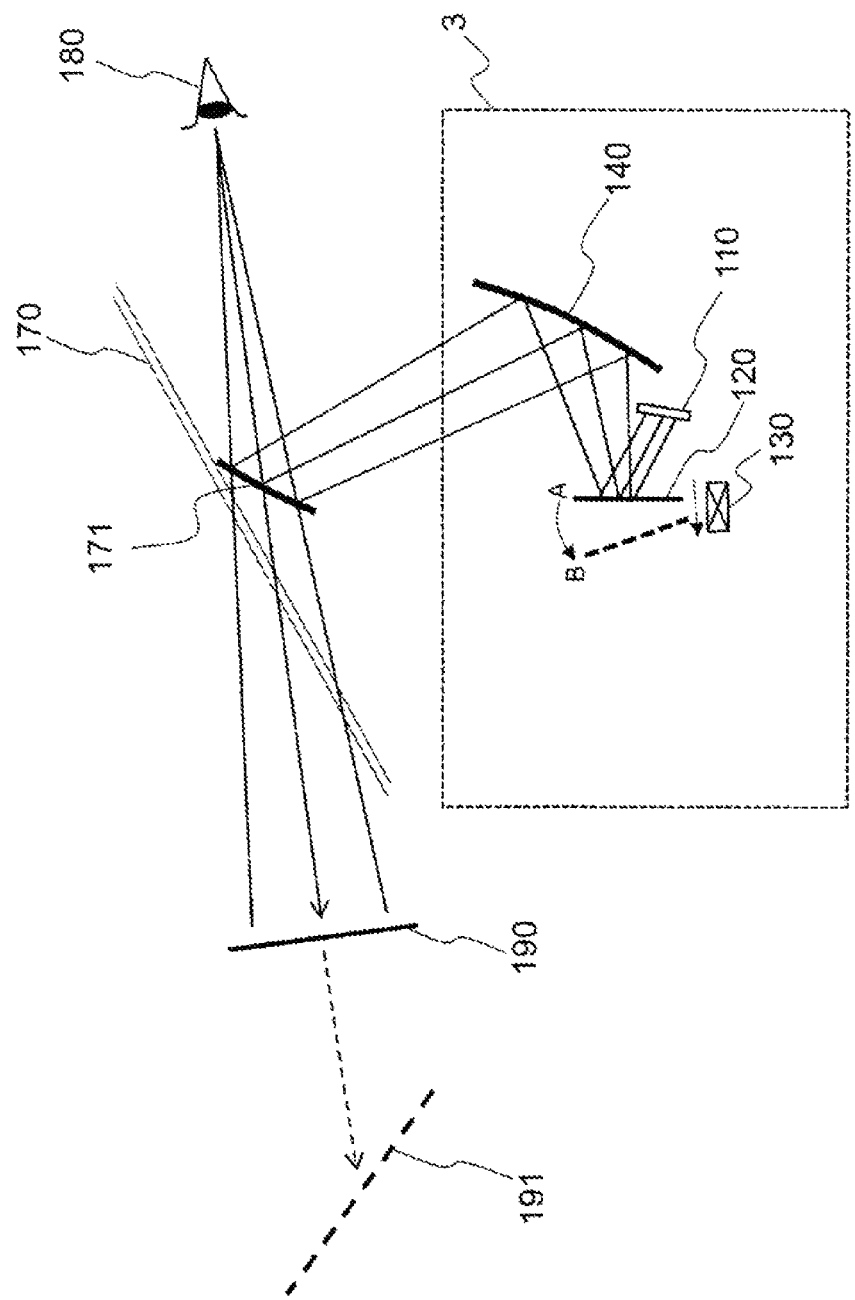
FIG. 8 is a view illustrating a configuration example of an optical system unit in a head-up display device according to a third exemplary embodiment.

FIG. 8 is a view illustrating a configuration example of head-up display device 3 according to a third exemplary embodiment of the present disclosure. Head-up display device 3 is a head-up display device that projects the display light to combiner 171 installed in the vicinity of windshield 170 of the vehicle.

Head-up display device 3 includes display 110, movable mirror 120 that is the first optical member, adjuster 130, and first mirror 140 that is the second optical member In FIG. 8, the component that performs operation similar to that in FIG. 3 is designated by the same reference mark, and the description will be omitted. In head-up display device 1 of the first exemplary embodiment, the display light is reflected by windshield 170. Head-up display device 3 of the third exemplary embodiment is the same as head-up display device 1 of the first exemplary embodiment except that head-up display device 3 of the third exemplary does not includes second mirror 150 but combiner 171 reflects the display light.

[3-2. Action]

Combiner 171 is an optical element that reflects part of the incident light while transmitting part of the incident light. Driver's eyes 180 can visually recognize a foreground image transmitted through combiner 171 and virtual image 190 reflected by combiner 171. Combiner 171 is constructed as a spherical concave surface, an aspherical concave surface, or a free curved concave surface.

In the third exemplary embodiment, the display light from display 110 is reflected by movable mirror 120 and first mirror 140, reflected by combiner 171, and reaches driver's eyes 180.

[3-3. Summary]

In head-up display device 3 of the third exemplary embodiment, movable mirror 120 and first mirror 140 reflect the display light output from display 110 toward combiner 171 to project the virtual image. Adjuster 130 can change the position of movable mirror 120.

With this configuration, adjuster 130 can adjust the display position of virtual image 190 by moving movable mirror 120.

Fourth Exemplary Embodiment

[4-1. Configuration]

Figure 9:
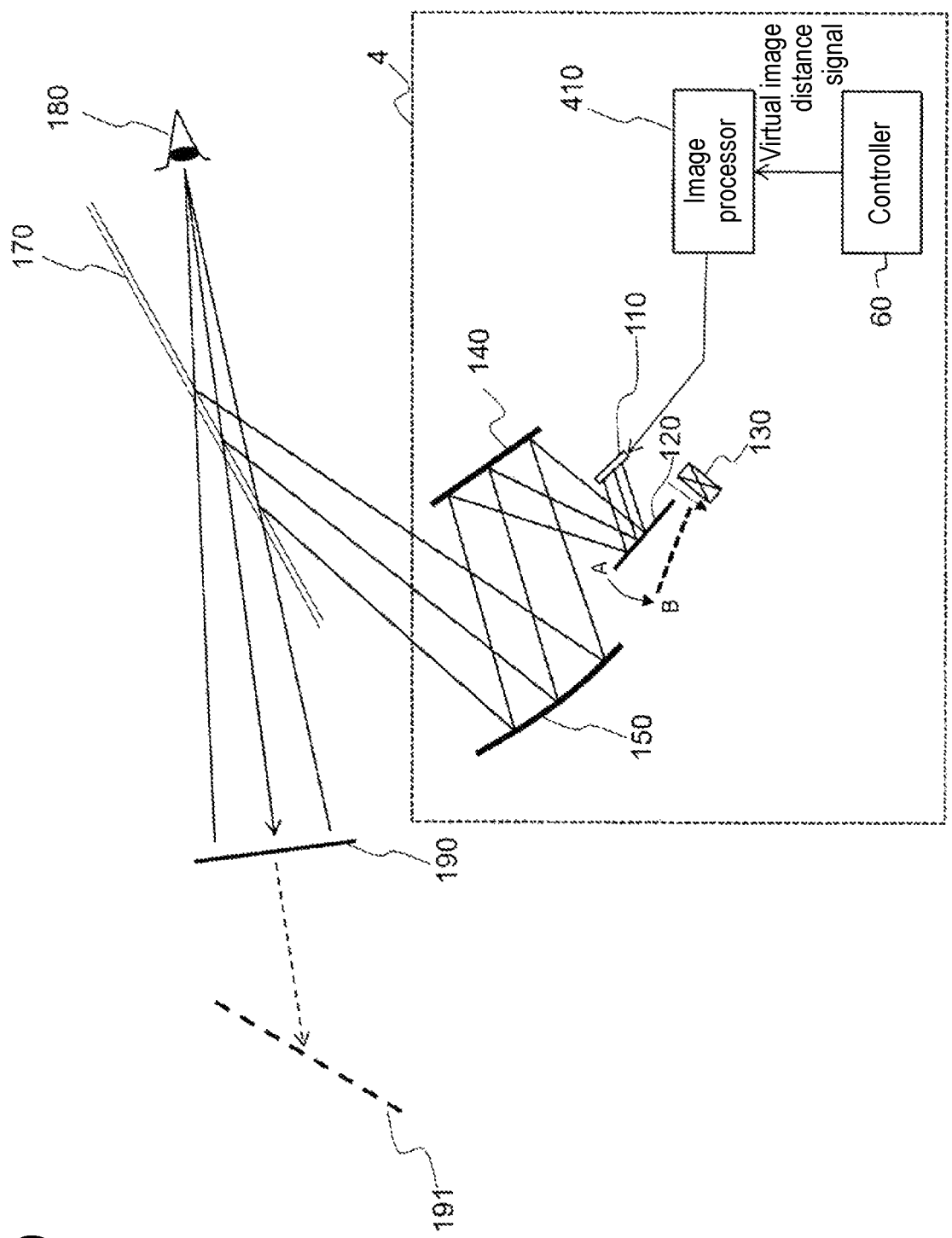
FIG. 9 is a view illustrating a configuration example of an optical system unit in a head-up display device according to a fourth exemplary embodiment.

FIG. 9 is a view illustrating a configuration example of an optical system unit in head-up display device 4 according to a fourth exemplary embodiment of the present disclosure. Head-up display device 4 is a head-up display device that projects the light to windshield 170 of the vehicle.

Head-up display device 4 includes display 110, movable mirror 120 that is the first optical member, adjuster 130, first mirror 140 that is the second optical member, second mirror 150, and image processor 410. In FIG. 9, the same component as that in FIG. 3 and the component that performs operation similar to that in FIG. 3 are designated by the same reference mark, and the description will be omitted.

Unlike the first exemplary embodiment, head-up display device 4 includes image processor 410 that corrects a picture or an image displayed on display 110. Image processor 410 may be provided in controller 60, or provided separately from controller 60.

[4-2. Action]

In the configuration of the first exemplary embodiment, a magnification of the projected virtual image to the picture or image displayed on display 110 changes in proportional to the virtual image distance. Thus, an angle of view of the virtual image visually recognized by the driver changes according to the change of the virtual image distance. That is, an apparent size of the virtual image changes in the case that the driver sees the virtual image at any distance. An amount of distortion aberration formed by first mirror 140 and second mirror 150 in the virtual image projection optical system changes by changing the virtual image distance.

The virtual image is distorted by the distortion aberration, and actual virtual image size is enlarged or reduced, so that the apparent size of the virtual image further changes by changing the virtual image distance.

Thus, when the virtual image distance is changed while the same picture or image is visually recognized, the apparent size and a degree of distortion of the virtual image change to degrade visibility of the virtual image.

The configuration in FIG. 9 solves the problem. In head-up display device 4, a virtual image distance signal that is a signal synchronous with the positional information about movable mirror 120 is received, and image processor 410 enlarges or reduces the picture or image displayed on display 110 in conjunction with the virtual image distance indicated by the virtual image distance signal. Controller 60 generates the virtual image distance signal based on a movement amount of movable mirror 120 or an adjustment amount of the projection distance of the virtual image. Consequently, even if the virtual image distance changes, the size of the virtual image at any distance can be kept constant when the virtual image is viewed from the driver.

The picture or image displayed on display 110 is intentionally distorted in the opposite direction to the distortion of the virtual image based on a previously-acquired correction amount, which allows the correction of the virtual image distortion generated by the change of the virtual image distance. Thus, image processor 410 distorts the picture or image displayed on display 110 by the correction in conjunction with the virtual image position signal, so that a shape of the virtual image can be kept constant when the virtual image is viewed from the driver at an arbitrary distance and the distortion of the projected virtual image can be reduced.

[4-3. Summary]

Head-up display device 4 of the fourth exemplary embodiment includes image processor 410 that corrects the picture or image displayed on display 110.

Consequently, even if the virtual image distance is changed, the apparent size of the virtual image is kept constant, and the distortion aberration can be decreased.

In the fourth exemplary embodiment, image processor 410 adjusts the display magnification of the display image such that the size of the virtual image is kept constant even if the virtual image distance is changed. Alternatively, image processor 410 may adjust the display magnification of the display image such that the size of the virtual image is changed according to the virtual image distance. For example, image processor 410 enlarges or reduces the picture displayed on display 110 such that the size of the virtual image is decreased when the virtual image distance is long, and such that the size of the virtual image is increased when the virtual image distance is short. In this way, the size of the virtual image is not kept constant, but the visibility of the virtual image can be enhanced even if perspective is used.

Fifth Exemplary Embodiment

[5-1. Configuration]

Figure 10:
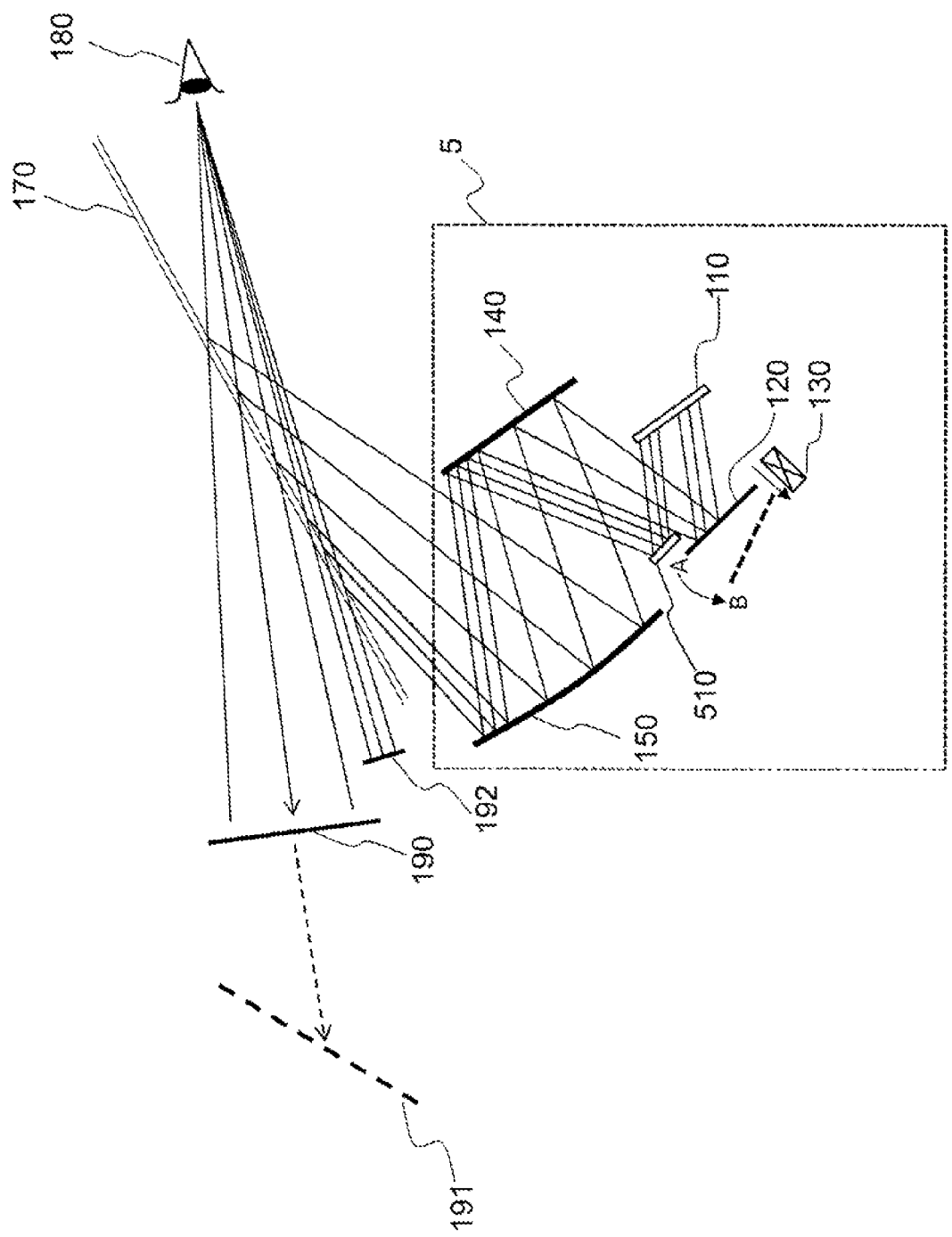
FIG. 10 is a view illustrating a configuration example of an optical system unit in a head-up display device according to a fifth exemplary embodiment.

FIG. 10 is a view illustrating a configuration example of an optical system unit in head-up display device 5 according to a fifth exemplary embodiment of the present disclosure. Head-up display device 5 is a head-up display device that projects the light to windshield 170 of the vehicle.

Head-up display device 5 includes display 110, movable mirror 120 that is a first optical member, adjuster 130, first mirror 140 that is a second optical member, second mirror 150, and third mirror 510. In FIG. 10, the same component as that in FIG. 3 and the component that performs operation similar to that in FIG. 3 are designated by the same reference mark, and the description will be omitted.

In FIG. 10, third mirror 510 is added to the configuration in FIG. 3. Consequently, in head-up display device 5, an optical system that displays two virtual images having different virtual image distances is disposed in one device.

Third mirror 510 reflects the display light that is not reflected by movable mirror 120. The position of third mirror 510 is fixed.

[5-2. Action]

In FIG. 10, similarly to the case in FIG. 3, first display light output from part of display 110 is reflected by movable mirror 120, condensed by first mirror 140 and second mirror 150, reflected by windshield 170, and reaches driver's eyes 180. Driver's eyes 180 visually recognized the first display light output from display 110 as first virtual image 190 in the distance ahead of windshield 170.

Second display light output from another part of display 110 is reflected by third mirror 510, condensed by first mirror 140 and second mirror 150, reflected by windshield 170, and reaches driver's eyes 180. Driver's eyes 180 visually recognized the second display light output from display 110 as second virtual image 192 in the distance ahead of windshield 170. The second display light is the display light that is not reflected by movable mirror 120.

In FIG. 10, movable mirror 120 is moved from position A to position B, which allows the virtual image distance of the first virtual image to be changed within a range from virtual image 190 to virtual image 191. The virtual image distance of the second virtual image is displayed at the position of virtual image 192 irrespective of the position of movable mirror 120.

Consequently, the information appropriately displayed in the foreground at any virtual image distance is displayed as the first virtual image, and the information, such as speed and warning, which needs not to overlap the foreground, can always be disposed at constant virtual image distance as the second virtual image. In this way, the head-up display device that can display the two screens can be constructed.

[5-3. Summary]

In head-up display device 5 of the fifth exemplary embodiment, third mirror 510 that is a third optical member is provided in the configuration of head-up display device 1. Movable mirror 120 reflects a part of the first display light output from display 110, and third mirror 510 reflects a part of the second display light that is not reflected by movable mirror 120 in the light output from display 110.

Consequently, another optical path can be provided in the display light output from display 110. For this reason, the two virtual images can simultaneously be displayed.

In the fifth exemplary embodiment, one display 110 outputs the first display light and the second display light. Alternatively, a plurality of display elements are provided, and the first display light and the second display light may individually be output from different display elements.

In the fifth exemplary embodiment, the position of third mirror 510 is fixed. Alternatively, the virtual image distance of the second virtual image may be variable by providing a movable unit similar to movable mirror 120 in third mirror 510.

Although head-up display device 5 of the fifth exemplary embodiment is constructed based on the configuration of head-up display device 1 of the first exemplary embodiment, third mirror 510 that is the third optical member may be provided in the head-up display device of the second or third exemplary embodiment. Consequently, the same function as the device of the fifth exemplary embodiment can be implemented.

Sixth Exemplary Embodiment

Figure 11:
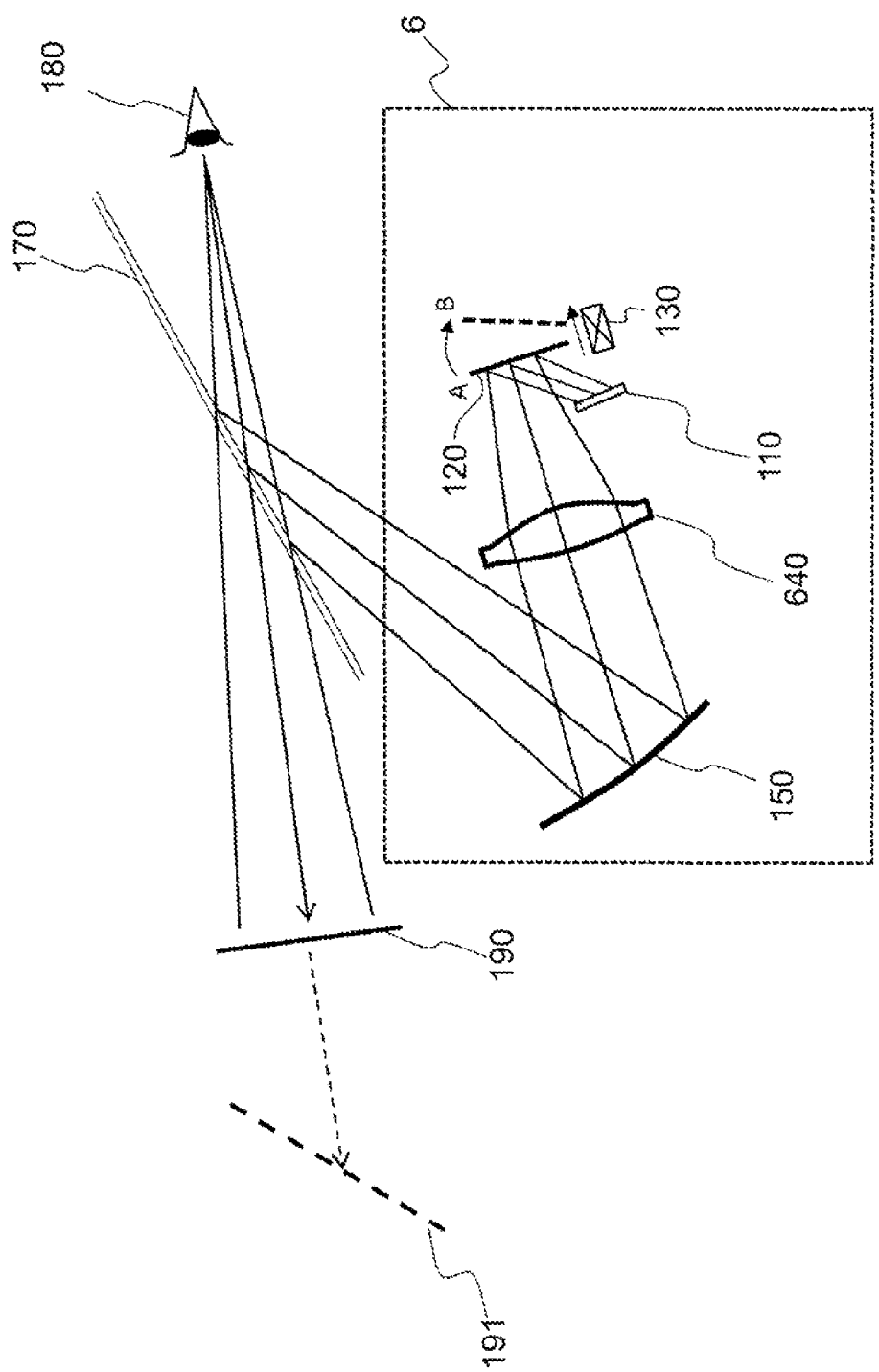
FIG. 11 is a view illustrating a configuration example of an optical system unit in a head-up display device according to a sixth exemplary embodiment.

FIG. 11 is a schematic side view illustrating a configuration example of head-up display device 6 according to a sixth exemplary embodiment of the present disclosure. In FIG. 11, the component that performs operation similar to that in FIG. 3 is designated by the same reference mark, and the description will be omitted.

In the first exemplary embodiment of FIG. 3, the planar mirror is used as first mirror 140 that is the second optical member. The sixth exemplary embodiment of FIG. 11 differs from the first exemplary embodiment in that spherical lens 640 is used as the second optical member instead of first mirror 140.

That is, head-up display device 6 of the sixth exemplary embodiment includes display 110, movable mirror 120, spherical lens 640, second mirror 150, and adjuster 130. Display 110 outputs the light that becomes the display image. Movable mirror 120 initially reflects the light output from display 110. Spherical lens 640 transmits the light reflected by movable mirror 120, and second mirror 150 reflects the light reflected by movable mirror 120, whereby spherical lens 640 and second mirror 150 project virtual image 190. Adjuster 130 adjusts the position of movable mirror 120, and adjusts the projection distance of virtual image 190. Movable mirror 120 is disposed at the position where the light, which is incident on movable mirror 120 and is reflected by movable mirror 120, becomes nonparallel to a normal line of movable mirror 120.

Consequently, for example, using a lens instead of the reflecting mirror, the projection optical system can be constructed while the optical path is not bent, which allows the compact head-up display device to be provided.

An aspherical lens or a free curved surface lens may be used instead of spherical lens 640.

A spherical lens, an aspherical lens, or a free curved surface lens may be used instead of second mirror 150 that is the second optical member. In this case, the mirror, spherical lens 640, and movable mirror 120 are disposed on a straight line.

In the second to fifth exemplary embodiments, the virtual image projection optical system may be constructed using the spherical lens, the aspherical lens, the free curved surface lens, or the like instead of the mirror that is the second optical member.

The first to sixth exemplary embodiments are described as illustration of the technique disclosed in the present application. However, the technique of the present disclosure is not limited to the first exemplary embodiment, but is applicable to another exemplary embodiment in which a change, a replacement, an addition, or an omission is appropriately made. Additionally, components described in the first to sixth exemplary embodiments can be combined to obtain a new exemplary embodiment.

The exemplary embodiments have been described for exemplifying the technique of the present disclosure. The appended drawings and the detailed description have been provided for that purpose.

Thus, some of the components described in the accompanying drawings and the detailed description may include not only components essential for solving the problem but also components not essential for solving the problem in order to illustrate the above technique. For this reason, it should not be construed that the component that are not essential are essential because the components are described in the appended drawings and the detailed description.

Because the above exemplary embodiments are used for illustrating the technique in the present disclosure, various changes, substitutions, additions, omissions, and the like can be made within the scope of claims or their equivalents.

INDUSTRIAL APPLICABILITY

The head-up display device of the present disclosure can be applied to not only the vehicle head-up display device, but also an airplane, a train, a ship, a special vehicle, and the like.

The invention claimed is:

1. A head-up display device which projects an image to cause a user to see the image in a target space as a virtual image, the head-up display device comprising:
    a display that outputs light to form the image corresponding to the virtual image;
    a first optical member that reflects light incident from the display;
    a second optical member that reflects the light reflected by the first optical member such that the virtual image is seen in the target space; and
    a driving mechanism that moves the first optical member to adjust a projection distance of the virtual image on an optical path between the user and the virtual image, wherein:
    the driving mechanism changes a distance between the first optical member and the second optical member and an inclination angle of the first optical member with respect to the display in accordance with the projection distance of the virtual image, and
    the driving mechanism changes the inclination angle during the movement of the first optical member such that a movement adjustment width of an end of the first optical member closer to the second optical member than to the display is greater than a movement adjustment width of another end of the first optical member closer to the display than to the second optical member.

2. The head-up display device according to claim 1, wherein the driving mechanism changes the distance and the inclination angle such that an optical path along which light outputted from a specific position in the display is reflected by the first optical member is not changed before and after the movement of the first optical member.

3. The head-up display device according to claim 1, wherein the display includes a light source having a plurality of light distribution directions respectively corresponding to a plurality of inclination angles of the first optical member, the plurality of inclination angles being different from each other.

4. The head-up display device according to claim 1, wherein the first optical member is a substantially planar mirror.

5. The head-up display device according to claim 1, wherein when the head-up display device is mounted on a vehicle, the first optical member, the second optical member, and the display are disposed such that an optical path corresponding to an upper portion of the virtual image in a vertical direction of the vehicle is longer than an optical path corresponding to a lower portion of the virtual image as the projection distance of the virtual image is longer.

6. The head-up display device according to claim 1, wherein the driving mechanism adjusts the projection distance of the virtual image, based on position information about a vehicle.

7. The head-up display device according to claim 1, wherein the driving mechanism adjusts the projection distance of the virtual image, based on vehicle speed information.

8. The head-up display device according to claim 1, further comprising
a third optical member that reflects light output from the display,
wherein the second optical member reflects light reflected by the third optical member to cause the user to see another virtual image different from the virtual image.

9. A vehicle comprising the head-up display device according to claim 1.

* * * * *